United States Patent [19]

Ryan et al.

[11] 3,891,988
[45] June 24, 1975

[54] SEARCH-WHILE-TRACK SYSTEM

[75] Inventors: Charles C. Ryan, Glen Burnie; Melvin D. Siedband, Baltimore, both of Md.; Abraham M. Fuchs, Rydal, Pa.

[73] Assignee: The United States of America as represented by the Secretary of the Navy, Washington, D.C.

[22] Filed: Jan. 16, 1964

[21] Appl. No.: 338,271

Related U.S. Application Data

[63] Continuation of Ser. No. 31,498, May 24, 1960, abandoned.

[52] U.S. Cl. ............ 343/16 LS; 343/7.3; 343/16 M
[51] Int. Cl.² .......................... G01S 9/22; G01S 7/28
[58] Field of Search ............ 343/16 R, 16 LS, 16 M, 343/7.3

[56] References Cited
UNITED STATES PATENTS

| | | | |
|---|---|---|---|
| 3,098,226 | 6/1963 | Revillon | 343/16 |
| 3,209,133 | 9/1965 | Downs | 343/7.3 X |
| 3,267,323 | 8/1965 | Gerwin | 343/7.3 X |

*Primary Examiner*—T. H. Tubbesing
*Attorney, Agent, or Firm*—R. S. Sciascia; C. Funkhouser; R. Beers

EXEMPLARY CLAIM

1. In a search-while-track radar system for determining the angular position of a target without stopping the antenna,
   saturated amplifier means adapted to receive video return signal pulses from said target,
   said saturated amplifying means having a storage means for storing the bias developed by said saturated amplifier means and allowing said bias to decay at a rate proportional to the change in amplitude of the video returns from pulse to pulse, and
   comparator circuit means connected to said saturated amplifier means for comparing the output of said amplifier with pulses which identify the lobe in which the video signals are received.

3 Claims, 6 Drawing Figures

PATENTED JUN 24 1975 3,891,988

SHEET 1

INVENTORS
CHARLES C. RYAN
MELVIN P. SIEDBAND
ABRAHAM M. FUCHS

BY Claude Funkhouser
ATTORNEY 3,891,988

SEARCH-WHILE-TRACK SYSTEM

This application is a continuation of application Ser. No. 31,498, filed May 24, 1960, now abandoned.

The present invention relates to a search-while-track system and, more particularly, to a search-while-track system wherein target angular position is obtained without stopping the antenna.

There are instances in airborne applications of radar systems where it is desirable to employ one radar system to search-while-track, or to track two targets simultaneously. In order for such a system to be feasible, it is necessary that target angular position be obtained without stopping the antenna.

An object of the present invention is the provision of a search-while-track system which is capable of determining target angular position without stopping the antenna.

Another object is to provide a system for accurately measuring target angular position while tracking two targets simultaneously.

A further object of the invention is the provision of a circuit which will produce an output pulse only when the radar-lobing synchronizing signal and the video return pulse are in time coincidence.

Other objects, advantages and novel features of the invention will become apparent from the following detailed description of the invention when considered in conjunction with the accompanying drawings wherein.

Figure 2A:
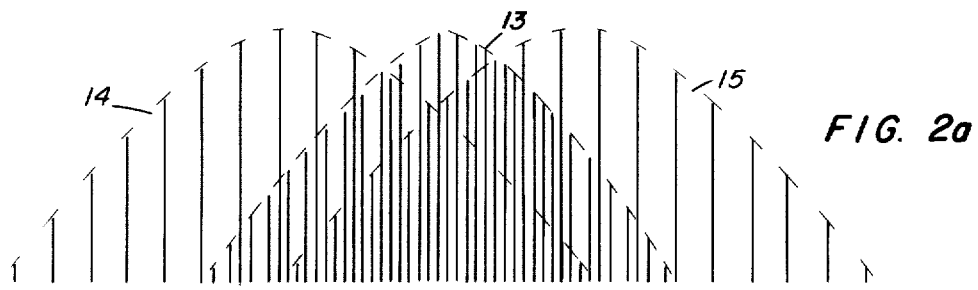
FIGS. 2a, 2b and 2c illustrate the envelopes of the target return pulses of the left and right lobes and the up and down lobes.
Figure 1:
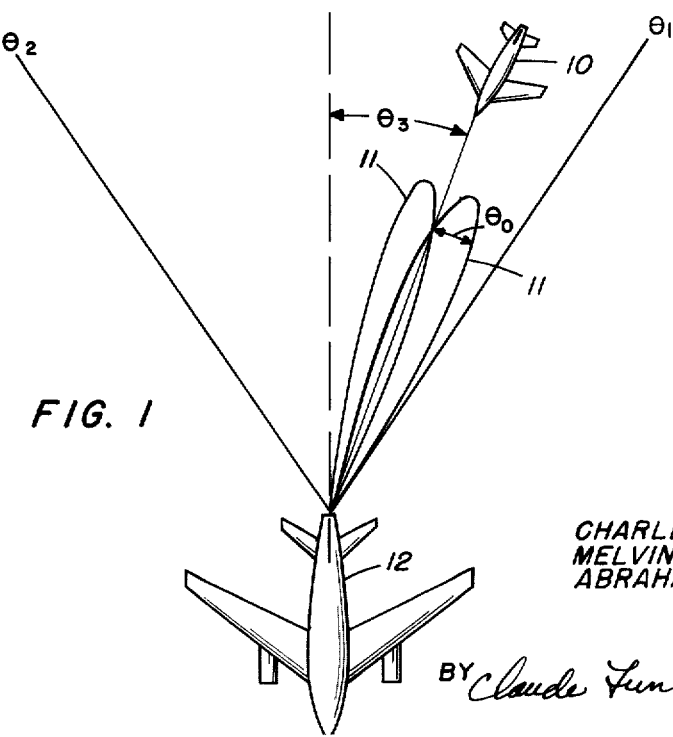
FIG. 1 shows a target which is illuminated by a search craft.

Referring now to the drawings, there is shown in FIG. 1 a target 10 illuminated by a radar beam 11 from a radar antenna of a radar system, not shown, mounted in the aft section of a search aircraft 12. Radar beam 11 scans over a path as shown in FIG. 1 and illuminates target 10 as it passes from $\theta_1$ to $\theta_2$. Radar signal returns are available from target 10 over the angle $2\theta_0$. The angle $\theta_3$ is the angle which must be measured accurately without stopping the sweeping of beam 11. As radar beam 11 passes through target 10, the video envelope in the radar system appears as shown in FIG. 2a. The radar tracking system used may be of the high-speed sequential lobing type although other known types of antenna lobing systems may be used. As radar beam 11 passes through target 10, the video envelope of the target pulse returns of a conventional radar system appears as shown in FIG. 2a, which is a pictorial representation of the left lobe envelope target returns 14, the right lobe envelope target returns 15, and the up and down lobe envelope target returns 13. Each pulse return will vary in signal strength as a function of antenna gain versus angle for a particular lobe.

The use of multiple lobes in radar systems is old and well-known. These multiple lobe systems increase the accuracy many times over that of the single lobe systems. The reason for this increase in accuracy is that the change in return efficiency at the center of the lobe is not as pronounced a change as at the edges. For this reason, the exact center of the target may not be accurately but only generally determined. This is readily apparent from looking at FIGS 1 or 2a and 2b. As can be seen, the top of a single return envelope has only a slight rate of change per increment of time compared to the lower edges.

Now if two lobes are used, the system can accurately determine the target center by comparing the difference in maximum amplitude of the return signals of the left and right lobe. The target center is then exactly between the two lobe return pulse maximums detected by the radar circuit.

The switching means for distinguishing between the different lobes can be of any form. The basic form of such a switching arrangement is disclosed in RADAR SYSTEM FUNDAMENTALS, April, 1944, T.O. 16-1-145, NAVSHIPS 900,017 published by the Government Printing Office.

Figure 2B:
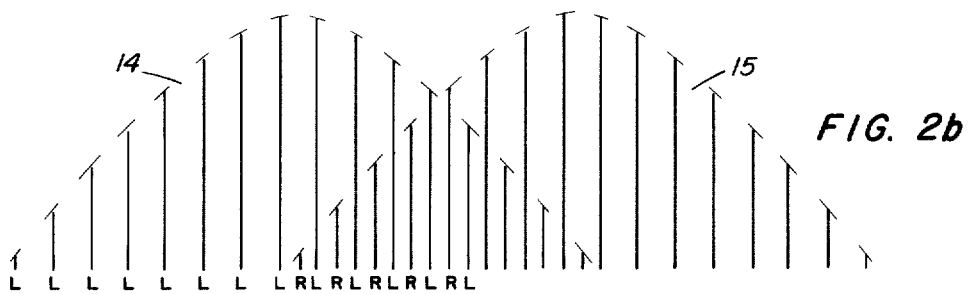
Figure 4:
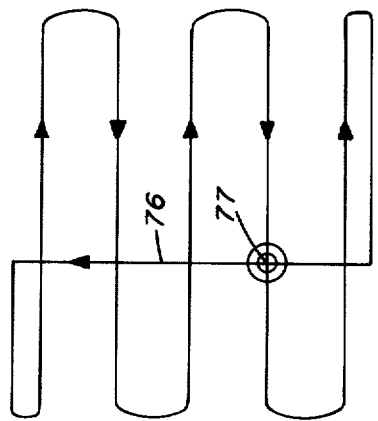
FIG. 4 shows the scan pattern used to obtain the elevation angle.

The up and down lobe envelope target returns 13 of FIG. 2a are gated out in any well-known manner; for example, a diode switch or other means known to those in the art may be used to prevent the video signal from reaching the coincidence circuit and leaves video signals 14 and 15 as shown in FIG. 2b. The identification of the target returns for blanking is done from that source in the radar system which establishes the lobe synchronizing signal for each pulse. As the radar antenna beam 11 scans from left to right, following the scan pattern that is illustrated in FIG. 4, lobe pulse synchronizing signals from the radar system are used for providing lobe switching, in order that the pulse transmitted by the radar transmitter and the target returns received in each antenna lobe can be identified with respect to the particular antenna lobe and antenna position.

Figure 3:
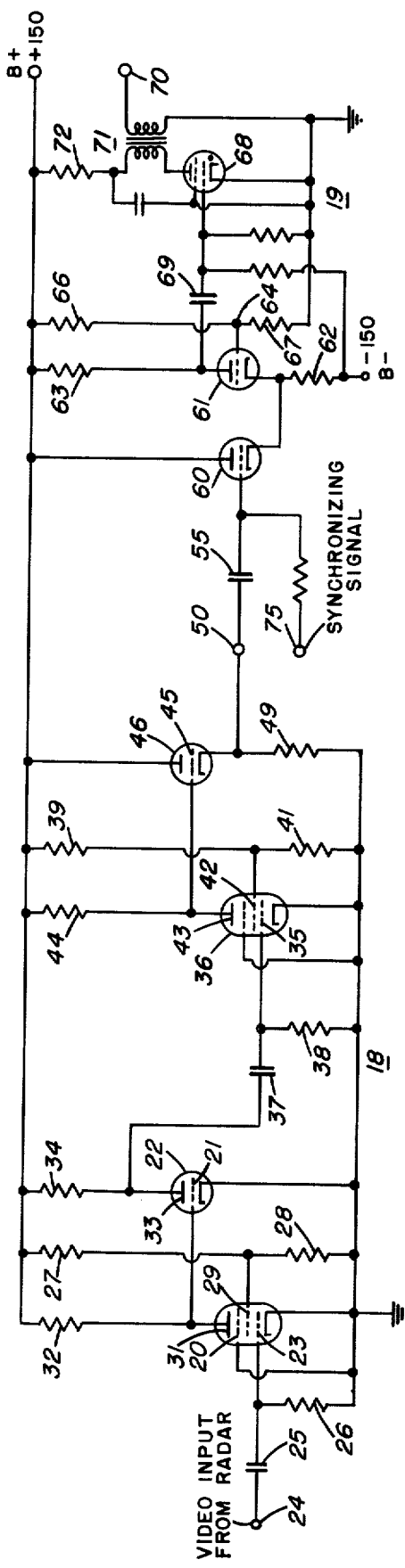
FIG. 3 shows the saturated video amplifier and coincidence circuit embodied in the invention.

FIG. 3 shows a two-stage saturated video amplifier 18 and coincidence circuit 19. Stage one of amplifier 18 comprises a pentode 20 having its output directly coupled from plate 31 and plate resistor 32 to the control grid 21 of triode 22. Control grid 23 of pentode 20 is connected to input terminal 24 through coupling capacitor 25. Resistor 26 provides bias for grid 23 and the voltage divider composed of resistors 27 and 28 provides voltage for screen grid 29. The output of tube 22 is coupled from plate 33 and plate resistor 34 to control grid 35 of tube 36 through coupling capacitor 37. Resistor 38 provides grid bias for grid 35 and the voltage divider composed of resistors 39 and 41 provides screen grid voltage for screen grid 42. The output of tube 36 is directly coupled from plate 43 and plate load resistor 44 to control grid 45 of triode 46. The output of tube 46 appears across cathode load resistor 49 and at terminal 50.

Coincidence circuit 19 consists of two triodes 60 and 61 with the cathodes of each connected to B− through common cathode resistor 62. The plate of tube 60 is connected directly to B+ while the plate of tube 61 is connected to B+ through plate resistor 63. A reference bias voltage is connected to the control grid of tube 61 from the common connection 64 of resistors 66 and 67 which are series connected between B+ and ground. The plate of tube 61 is coupled to the control grid of gas discharge tube 68 through coupling capacitor 69. The plate of tube 68 is connected to B+ through the primary winding of pulse forming transformer 71 and resistor 72. The output pulse appears across the secondary winding of transformer 71 and at terminal 70.

Figure 2C:
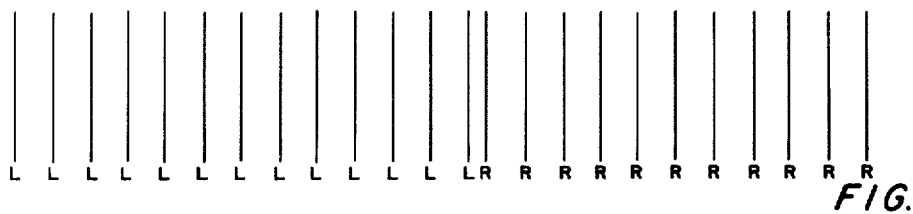

In operation, the two stages of amplifier 18 have sufficient gain so that the second stage will always operate in a saturated condition. The time constant of coupling capacitor 37 and resistor 38 is chosen so that the voltage developed at capacitor 37, as a result of overdriving of grid 35 of tube 36, decays at a rate sufficient to prevent input pulses smaller than one decibel below the preceeding video pulse level from appearing at output terminal 50, i.e., the decay rate approximates an equivalent signal change of one decibel during the time between pulses of the same lobe. For example, with reference to FIGS. 2b and 2c, as the antenna travels toward the right, approximately 10 left lobe target pulses appear at the output terminal 50, as shown in FIG. 2c, before the first right lobe target pulse is received by the radar system. As the radar antenna moves closer and closer to the target center, the left lobe target pulses and right lobe target pulses approach each other in amplitude (FIG. 2b). At the point where a left lobe target pulse equals a right lobe target pulse an output will appear at terminal 50, representative of the right lobe target pulse. As the radar antenna keeps moving to the right, only right lobe target pulses will appear at the output of terminal 50 because they now exceed the left lobe target pulses. This operation is repeated if a target is present on successive scanning passes of the radar antenna beam 11. The saturated video signal at terminal 50 is coupled to the control grid of tube 60 of coincidence circuit 19 by coupling capacitor 55. The coincidence circuit 19 will produce an output pulse at 70 only when the lobing synchronizing signal applied at terminal 75 is in the time coincidence with the saturated video pulses appearing at terminal 50. It is possible to apply the video and synchronizing signals to the same control grid since the synchronizing signal is of a large time duration as compared to the time duration of the video signal. To obtain the elevation angle of the target, the radar antenna as it makes the last scanning path, which would be in the lower right hand corner of the scan pattern as shown in FIG. 4, uses a return trace 76 that is programmed through the predicted position of the target 77's center as determined by the azimuth output information from terminal 70. As the elevation return of the antenna is directed through the predicted target's center, a lobe pulse synchronizing signal blanks out the azimuth left lobe target returns 14 and right lobe target returns 15. Thus, allowing the saturated video amplifier 18 and the coincidence circuit 19 to operate on the up and down lobe target returns 13 in the same manner as explained above with respect to the azimuth left lobe target returns 14 and right lobe target returns 15. This operation will determine the target's center with respect to vertical and therefore will give the elevation angle of the target.

The rotation antenna of radar systems commonly use some means such as a potentiometer for purposes of determining the instantaneous position or azimuth of the antenna. If the antenna is energized at a given instant, it can be said that it will give the azimuth reading. When the antenna position gives a reading only when the exact center of the target is located, the target angle is readily obtained.

The output signal at 70 is used to read an antenna azimuth potentiometer to obtain the angular position of the target. For example, the signal could be used to operate switch 36 of the target position predicting servomechanism shown and described in copending application of Charles C. Ryan, Melvin P. Siedband and David R. Houston, Ser. No. 837,308 filed Aug. 31, 1959, now U.S. Pat. No. 3,090,556.

Obviously many modifications and variations of the present invention are possible in the light of the above teachings. It is therefore to be understood that within the scope of the appended claims the invention may be practiced otherwise than as specifically described.

What is claimed is:

1. In a search-while-track radar system for determining the angular position of a target without stopping the antenna, saturated amplifier means adapted to receive video return signal pulses from said target, said saturated amplifying means having a storage means for storing the bias developed by said saturated amplifier means and allowing said bias to decay at a rate proportional to the change in amplitude of the video returns from pulse to pulse, and comparator circuit means connected to said saturated amplifier means for comparing the output of said amplifier with pulses which identify the lobe in which the video signals are received.

2. In a search-while-track radar system for determining the angular position of a target without stopping the antenna, a comparator circuit comprising:

first and second triode tubes, each of said triodes having its cathode connected to the negative terminal of a voltage source through a common resistor, the anode of said first triode being connected to the positive terminal of said voltage source, the anode of said second triode being connected to the positive terminal of said voltage source through a load resistor, the grid of said first triode being adapted to have a saturated video pulse and a lobe reference pulse coupled thereto, the grid of said second triode being connected to a reference voltage source, the plate of said second triode being coupled to the input terminal of a pulse generating circuit, said saturated video pulse being short in time duration as compared to said lobe reference pulse, whereby said pulse generating circuit will generate a pulse in response to the output of said second tube only when said saturated video pulse and said lobe reference pulse are in time coincidence.

3. In a search-while-track radar system for determining the angular position of a target without stopping the antenna, a saturated amplifier comprising:

a first high gain amplifying tube for amplifying the return video pulses of said target and having an output, a second amplifying tube, capacitor coupling means coupling the output of said first tube to the input of said second tube, said capacitor being of such size that the bias developed on the control grid of said second tube is stored and allowed to decay at a rate proportional to the change in amplitude of the video returns from pulse to pulse.

* * * * *